Nov. 15, 1966    J. H. CLARK    3,285,576

FENCE POST AND FENCE

Filed Oct. 12, 1964

James H. Clark,
INVENTOR.

BY Robert C. Comstock

Attorney

United States Patent Office 3,285,576
Patented Nov. 15, 1966

3,285,576
FENCE POST AND FENCE
James H. Clark, Orange, Calif.
(925 Orangethorpe Park, Anaheim, Calif.)
Filed Oct. 12, 1964, Ser. No. 403,123
3 Claims. (Cl. 256—21)

This invention relates to a fence post and fence.

It is the primary object of my invention to provide a fence post and fence which are primarily adapted for agricultural use and which are an improvement over the conventional fence posts and fence which are now in use.

It is a more particular object of my invention to provide a fence post and fence which are stronger, longer lasting and more economical because they are constructed of galvanized steel tubing which never requires painting and which can not be chewed, broken or otherwise damaged by livestock, weather and other deteriorative forces.

It is a further particular object of my invention to provide a fence post and fence which are safer for livestock because all of the surfaces are smooth and rounded metal which is not harmful or injurious to the livestock. The fence and post can not be chewed or otherwise destroyed or damaged by animals and they can not rot, splinter or break. As a result, the fence post and fence are safe from damage by the livestock and the livestock are in turn safe from being injured by the fence.

Another object of my invention is to provide a tubular steel fence and fence post construction which can be assembled and erected without the use of any special skill or tools. No welding is required, all of the parts being pre-welded and being assembled by the user with only a hammer and nails.

Still another object of my invention is to provide a fence post and fence of the type described which are substantially as economical to erect as conventional types of fencing, but which are more economical in the long run because of the reduced maintenance costs involved.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings.

Figure 1:
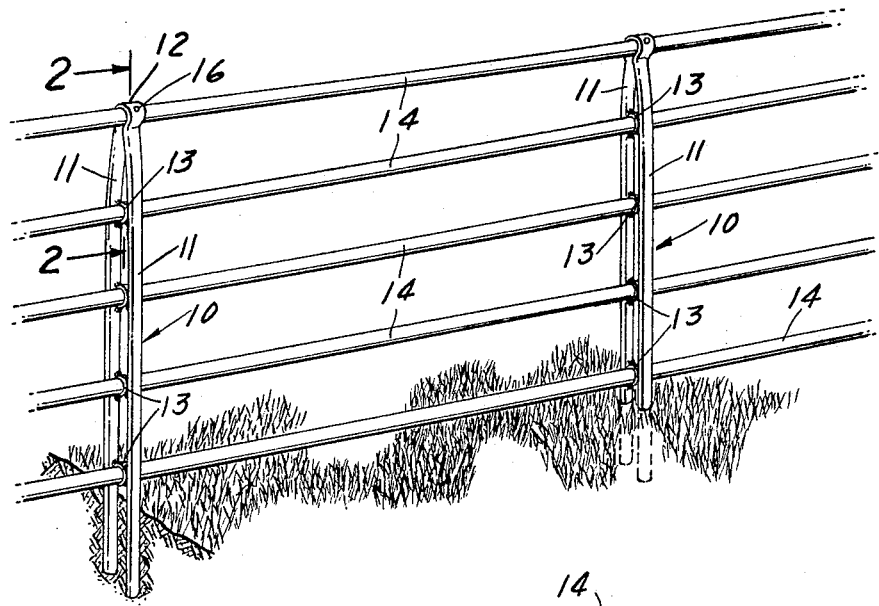
FIG. 1 is a perspective view of a section of my fence and two fence posts in use, with the ground partly broken away beneath one fence post to show the bottom of the post which extends into the ground.
Figure 2:
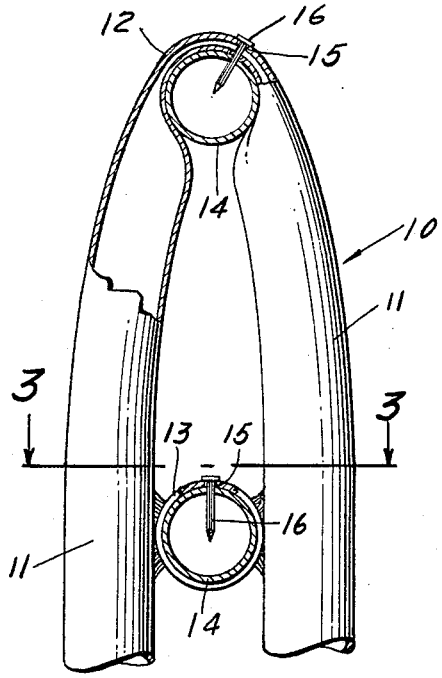
FIG. 2 is a longitudinal sectional view of the upper portion of the fence post, taken along line 2—2 of FIG. 1.
Figure 3:
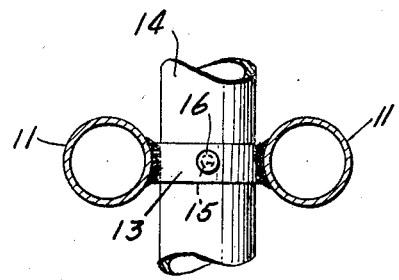
FIG. 3 is a sectional view of the same, taken along line 3—3 of FIG. 2.

A preferred embodiment which has been selected to illustrate my invention comprises a fence post 10 which is formed by a length of galvanized steel tubing being bent back upon itself at its center in hairpin fashion to provide a pair of legs 11, which are substantially parallel and disposed a short distance apart from each other.

The upper end of the post 10 is flattened to form a circular loop 12, which comprises approximately three-fourths of a circle. Spaced downwardly from the loop 12 are a plurality of spaced rings 13, each of which is welded to each of the legs 11. The rings 13 are short sections of galvanized steel tubing which extend transversely to the legs 11. It will be noted that the circular loop 12 forms a substantially complete ring which is adapted to serve the same function as the rings 13 in supporting the uppermost rail of the fence.

A plurality of cross rails 14, which are also preferably formed of tubular galvanized steel, are slidably mounted through the loops 12 and rings 13 of the fence posts 10. Each of the rings 13 is provided on the top thereof with a small circular pre-punched opening 15, which is dimensioned to receive the end of a self-piercing masonry nail 16. A similar opening 15 is provided on the upper side of the loop 12.

When the rails 14 are in their proper positions, the nails 16 are driven with a hammer so that they provide their own openings through one wall of the adjacent rails 14 to lock the rails 14 in position with respect to the posts 10.

It is accordingly possible for my fence post and fence to be erected in a "do it yourself" manner by a relatively unskilled person having a minimum amount of tools and know-how. Erection of the fence and post requires no skills or tools other than those possessed by the average farmer or rancher.

Once erected, the fence never requires painting or other maintenance, is immune to deteriorative forces of all kinds, is non-injurious to livestock and is stronger than a fence formed of other materials.

While any suitable types and dimensions of materials may be used, fence posts having a diameter of 1¾" and rails having a dimension of 1⅝" have been found to be satisfactory in use. If desired, wooden rails may be used with the fence post, being threaded through the rings and nailed in place.

I claim:

1. A fence comprising at least one fence post, said fence post comprising a length of galvanized tubular steel bent back upon itself at its center to form a pair of substantially parallel spaced legs, the upper end of said post being flattened to form a loop having a circumference greater than that of a semi-circle, a plurality of transversely directed rings mounted in vertically spaced relationship between the legs of said post, one side of each of said rings being welded to each of said legs, each of said rings comprising a section of galvanized steel tubing, a plurality of parallel galvanized tubular steel rails extending transversely to said post, said loop and each of said rings slidably receiving and supporting one of said rails, said loop and each of said rings having a pre-punched opening in the upper portion thereof, and a self-piercing nail extending through each of said rings and said loop and through one wall of the adjacent rail to secure said rails to said post.

2. The structure described in claim 1, the upper portion of said loop comprising a pair of arcuate parallel walls spaced a short distance apart from each other, said self-piercing nail extending through both of said walls.

3. A fence comprising at least one fence post, said fence post comprising a length of galvanized tubular steel bent back upon itself at its center to form a pair of substantially parallel spaced legs, a plurality of transversely directed rings mounted in vertically spaced relationship between the legs of said post, one side of each of said rings being welded to each of said legs, each of said rings comprising a section of galvanized steel tubing, a plurality of parallel galvanized tubular steel rails extending transversely to said post, each of said rings slidably receiving and supporting one of said rails, each of said rings having a pre-punched opening in the upper portion thereof, and a self-piercing nail extending through each of said rings and through one wall of the adjacent rail to secure said rails to said post.

References Cited by the Examiner

UNITED STATES PATENTS

| | | | |
|---|---|---|---|
| 213,506 | 3/1879 | Grant | 256—64 |
| 340,263 | 4/1886 | Weber | 256—69 X |
| 348,383 | 8/1886 | Cummings | 256—59 X |
| 1,154,625 | 9/1915 | Gutenkunst | 256—68 |
| 2,608,386 | 8/1952 | Hart | 256—65 |
| 3,203,396 | 8/1965 | Carmichael | 256—24 X |

HARRISON R. MOSELEY, *Primary Examiner.*

D. L. TAYLOR, *Assistant Examiner.*